US010072765B2

(12) United States Patent
Beschorner et al.

(10) Patent No.: US 10,072,765 B2
(45) Date of Patent: Sep. 11, 2018

(54) VALVE HAVING SPOOL ASSEMBLY WITH INSERT DIVIDER

(71) Applicant: Caterpillar Inc., Peoria, IL (US)

(72) Inventors: Matthew J. Beschorner, Plainfield, IL (US); Mikhail A. Sorokin, Naperville, IL (US)

(73) Assignee: Caterpillar Inc., Deerfield, IL (US)

(*) Notice: Subject to any disclaimer, the term of this patent is extended or adjusted under 35 U.S.C. 154(b) by 212 days.

(21) Appl. No.: 15/050,614

(22) Filed: Feb. 23, 2016

(65) Prior Publication Data

US 2017/0002936 A1    Jan. 5, 2017

Related U.S. Application Data

(60) Provisional application No. 62/187,907, filed on Jul. 2, 2015.

(51) Int. Cl.
  *F16K 11/065* (2006.01)
  *F15B 13/04* (2006.01)
  *F16K 11/07* (2006.01)

(52) U.S. Cl.
  CPC ........ *F16K 11/065* (2013.01); *F15B 13/0402* (2013.01); *F16K 11/0716* (2013.01)

(58) Field of Classification Search
  CPC .. F16K 11/0716; F16K 11/0712; F16K 11/07; F16K 11/065; F15B 13/0402
  See application file for complete search history.

(56) References Cited

U.S. PATENT DOCUMENTS

| 3,195,559 | A | 7/1965 | Stacey |
| 3,789,880 | A | 2/1974 | Armstrong et al. |
| 4,519,419 | A | 5/1985 | Petro |
| 6,402,944 | B1* | 6/2002 | Vaughan ............ C02F 1/42 137/597 |
| 2011/0000447 | A1 | 1/2011 | Hoppe et al. |
| 2011/0132476 | A1 | 6/2011 | Rub |
| 2011/0315257 | A1 | 12/2011 | Anderson et al. |
| 2012/0192975 | A1 | 8/2012 | Lehner et al. |
| 2013/0153043 | A1 | 6/2013 | Payne |
| 2014/0290659 | A1 | 10/2014 | Chen et al. |

FOREIGN PATENT DOCUMENTS

WO    2013131881    9/2013

* cited by examiner

*Primary Examiner* — Reinaldo Sanchez-Medina
*Assistant Examiner* — Nicole Gardner
(74) *Attorney, Agent, or Firm* — Finnegan, Henderson, Farabow, Garrett & Dunner, LLP

(57) ABSTRACT

A spool assembly is disclosed for use in a valve. The spool assembly may have a cylindrical body that is hollow and has a least one radially oriented orifice that passes through a wall of the cylindrical body. The spool assembly may also have an insert slidably disposed inside the cylindrical body. The insert may have a land that axially divides a space inside the cylindrical body.

6 Claims, 3 Drawing Sheets

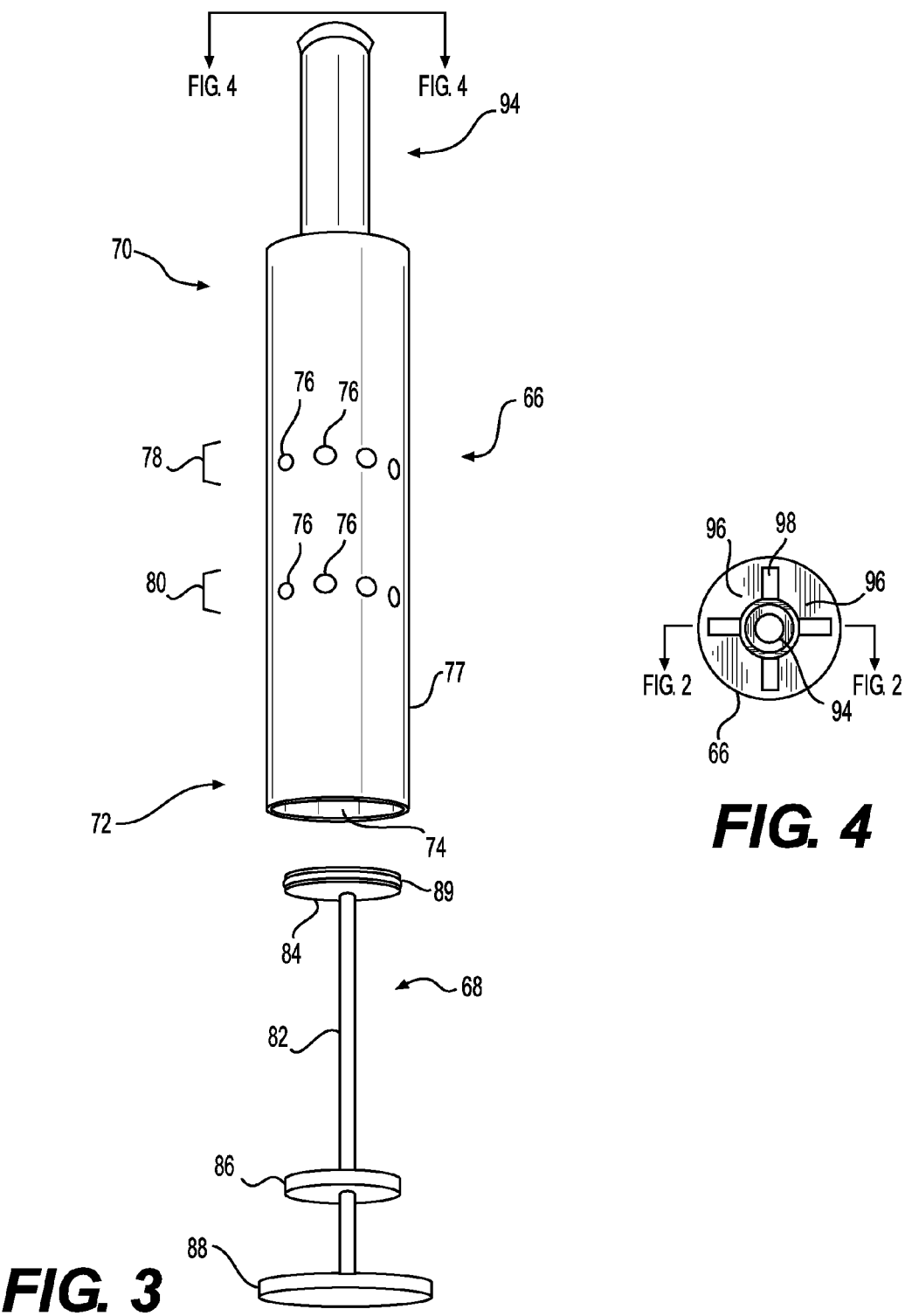

VALVE HAVING SPOOL ASSEMBLY WITH INSERT DIVIDER

CROSS-REFERENCE TO RELATED APPLICATIONS

This application claims the benefit of U.S. Provisional Patent Application No. 62/187,907, entitled "VALVE HAVING SPOOL ASSEMBLY WITH INSERT DIVIDER," and filed on Jul. 2, 2015.

TECHNICAL FIELD

The present disclosure relates generally to a valve and, more particularly, to a valve having a spool assembly with an insert divider.

BACKGROUND

Hydraulic machines such as dozers, loaders, excavators, backhoes, motor graders, and other types of heavy equipment use one or more hydraulic actuators to accomplish a variety of tasks. These actuators are fluidly connected to a pump of the machine that provides pressurized fluid to chambers within the actuators, and also connected to a sump of the machine that receives low-pressure fluid discharged from the chambers of the actuators. As the fluid moves through the chambers, the pressure of the fluid acts on hydraulic surfaces of the chambers to affect movement of the actuators. A flow rate of fluid through the actuators corresponds to a velocity of the actuators, while a pressure differential across the actuators corresponds to a force of the actuators.

Control over the speed and/or force of hydraulic actuators can be provided by way of one or more metering valves. For example, a first metering valve controls fluid flow into a head-end of a hydraulic cylinder, while a second metering valve controls fluid flow out of the head-end. Likewise, a third metering valve controls fluid flow into a rod-end of the hydraulic cylinder, while a fourth metering valve controls fluid flow out of the rod-end. The different metering valves are cooperatively opened and closed (e.g., based on operator input) to cause fluid to flow into one end of the hydraulic cylinder and simultaneously out of an opposing end, thereby extending or retracting the hydraulic cylinder.

A conventional metering valve includes a body having a bore that receives a spool, and two or more passages formed in the body that communicate with each other via the spool. The spool is generally cylindrical, and includes lands that extend outward away from the body on either side of a valley. When the lands are positioned at one or more entrances of the passages, the spool is in a flow-blocking position. When the spool is moved to a flow-passing position, the valley extends over the entrances such that fluid communication between the passages is established via the valley.

Although conventional spools are acceptable in many applications, they can be massive and require a significant amount of energy to move them between the flow-blocking and flow-passing positions. In addition, because of their mass, the movements of the spools can be slow, causing the associated hydraulic system to be less responsive than desired. The lack of responsiveness caused by the spools may require the use of additional hydraulic components (e.g., mechanical and/or hydro-mechanical compensators) to offset the effects of the slow spools.

One attempt to improve hydraulic system responsiveness is disclosed in a technical paper titled "FLOW FORCES ANALYSIS OF AN OPEN CENTER HYDRAULIC DIRECTIONAL CONTROL VALVE SLIDING SPOOL" written by R. Amirante et al. that published in the *Energy Conversion and Management* journal in 2006 ("the technical paper"). In particular, the technical paper discloses a hollow spool disposed in the bore of a valve body. The valve body defines a tank port, a pump port, a first work port, and a second work port all in communication with the bore. The hollow spool includes four patterns of radial orifices, wherein two of the patterns are located at a first end of the hollow spool and associated with the first work port, and two of the patterns are located at a second end and associated with the second work port. The two ends of the hollow spool are internally isolated by a block, such that the two ends do not fluidly communicate with each other. The hollow spool is moved between on- and off-positions. In a first on-position, the radial orifices in the first end of the spool connect the first work port with the pump port via the hollow interior of the spool, while the radial orifices in the second end of the spool connect the second work port with the tank port via the hollow interior of the spool. In a second on-position, the radial orifices in the second end of the spool connect the second work port with pump port via the hollow interior of the spool, while the radial orifices in the first end of the spool connect the first work port with the tank port via the hollow interior of the spool. The hollow spool is center-biased by way of springs to an off-position, at which the first and second work ports are not fluidly connected with either of the pump or tank ports.

Although the hollow spool described in the technical paper may have reduced mass and, therefore, improved responsiveness, it may still be less than optimal. In particular, the integral block formed inside the hollow spool between the first and second ends moves with the hollow spool during valve actuation. As a result, the block axially displaces oil from the valve body during each movement. This displacement of oil may require a significant amount of energy, and still result in some system delay.

The disclosed valve and spool are directed to overcoming one or more of the problems set forth above and/or other problems of the prior art.

SUMMARY

One aspect of the present disclosure is directed to a spool assembly for a valve. The spool assembly may include a cylindrical body that is hollow and has a least one radially oriented orifice that passes through a wall of the cylindrical body. The spool assembly may also include an insert slidably disposed inside the cylindrical body. The insert may have a land that axially divides a space inside the cylindrical body.

Another aspect of the present disclosure is directed to a valve. The valve may include a block having a bore, a first passage extending to the bore at a first axial location, and a second passage extending to the bore at a second axial location. The valve may also include a spool assembly disposed within the bore of the block. The spool assembly may include a cylindrical body that is hollow and has a least a first radially oriented orifice that passes through a wall of the cylindrical body to communicate with the first passage, and at least a second radially oriented orifice that passes through the wall of the cylindrical body to communicate with the second passage. The spool assembly may also include an insert slidably disposed inside the cylindrical body and fixedly connected to the block. The insert may have a first land located at a first end adjacent the at least a first radially oriented orifice, and a second land located at a second end adjacent the at least a second radially oriented orifice. The valve may further include an actuator configured to move the cylindrical body of the spool assembly relative to the block and the insert.

Another aspect of the present disclosure is directed to a hydraulic circuit. The hydraulic circuit may include an actuator, a pump, a sump, and a valve disposed between the actuator, the pump, and the sump. The valve may include a valve body having a bore with a first end and a second end, a first passage formed adjacent the first end in communication with the bore and in communication with the actuator, a second passage formed adjacent the second end in communication with the bore and in communication with one of the pump and the sump, and a tapered seat located between the first and second passages. The valve may also include a spool assembly disposed within the bore of the block. The spool assembly may include a cylindrical body that is hollow and has a least a first radially oriented orifice that passes through a wall of the cylindrical body to communicate with the first passage and at least a second radially oriented orifice that passes through the wall of the cylindrical body to communicate with the second passage. The spool assembly may also include an insert slidably disposed inside the cylindrical body and fixedly connected to the block. The insert may have a first land located at a first end adjacent the at least a first radially oriented orifice and a second land located at a second end adjacent the at least a second radially oriented orifice. The spool assembly may further include a valve actuator connected to the block and configured to move the cylindrical body of the spool assembly relative to the block and the insert.

BRIEF DESCRIPTION OF THE DRAWINGS

FIG. 3 is an isometric exploded view illustration of an exemplary disclosed spool that may be used in conjunction with the valve of FIGS. 2A and 2B; and FIG. 4 is a diagrammatic illustration of the spool of FIG. 3.

DETAILED DESCRIPTION

Figure 1:
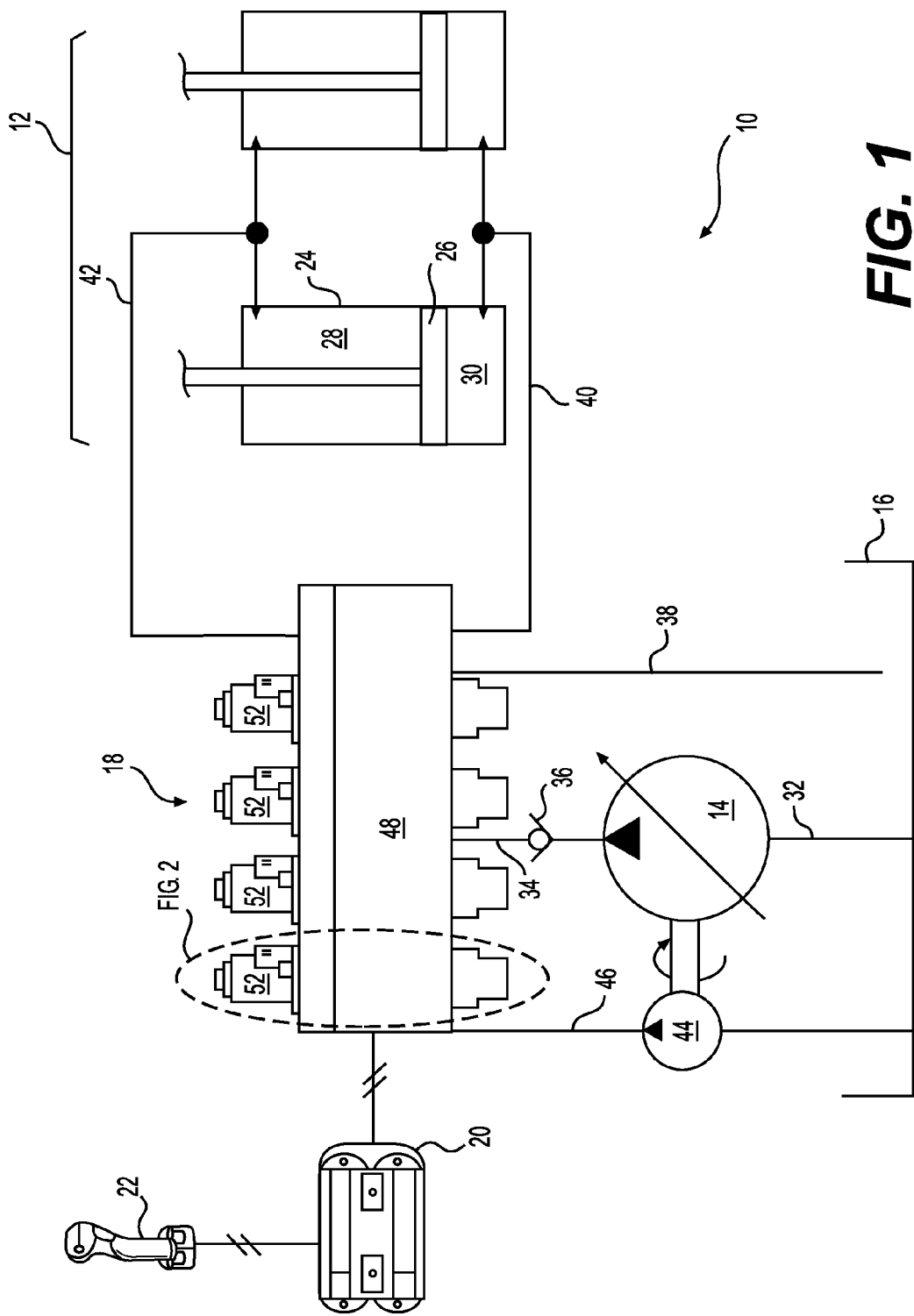
FIG. 1 is a diagrammatic illustration of an exemplary hydraulic circuit.

FIG. 1 illustrates an exemplary hydraulic circuit 10 having at least one tool actuator 12 that is movable based on input received from an operator. In the disclosed embodiment, two actuators 12 are shown that are arranged to operate in tandem. These tool actuators 12 are linear actuators (e.g., cylinders) that are commonly used to raise and lower the boom of a construction machine (e.g., an excavator—not shown). It is contemplated, however, that any number of tool actuators 12 could be included in hydraulic circuit 10, and embody linear or rotary actuators, as desired. Hydraulic circuit 10 may further include a pump 14 configured to draw low-pressure fluid from a sump 16, to pressurize the fluid, and to direct the pressurized fluid through a valve 18 to tool actuators 12. Valve 18, as will be described in more detail below, may be selectively energized by a controller 20 in response to operator input received via an interface device 22 to regulate a flow direction, a flow rate, and/or a pressure of fluid communicated with tool actuators 12.

Tool actuators 12, as hydraulic cylinders, may each include a tube 24 and a piston assembly 26 arranged within tube 24 to form a first chamber 28 and an opposing second chamber 30. In one example, a rod portion of piston assembly 26 may extend through an end of first chamber 28. As such, first chamber 28 may be considered the rod-end chamber of tool actuator 12, while second chamber 30 may be considered the head-end chamber. Chambers 28, 30 may each be selectively supplied with pressurized fluid and drained of the pressurized fluid to cause piston assembly 26 to displace within tube 24, thereby changing an effective length of tool actuator 12.

It should be noted that, in embodiments where tool actuator 12 is a rotary actuator, the configuration and operation of tool actuator 12 would be similar to that described above for a linear actuator. For example, as a hydraulic motor, tool actuator 12 would include two chambers separated by an impeller. One of these chambers would be selectively supplied with pressurized fluid while the remaining chamber would be drained of fluid to thereby generate a pressure differential that causes the impeller to rotate. The particular chamber filled with fluid or drained of fluid may dictate the rotational direction of the actuator, while the pressure differential and flow rate may dictate the actuation force and speed, respectively.

Pump 14 may be fluidly connected to sump 16 by way of suction passage 32, and to valve 18 via a pressure passage 34. In some embodiments, a check valve 36 may be disposed in pressure passage 34 to help ensure a unidirectional flow of fluid from pump 14 to valve 18. Pump 14 may be any type of pump known in the art, for example a fixed or variable displacement piston pump, gear pump, or centrifugal pump. Pump 14 may be driven by an engine, by an electric motor, or by any other suitable power source.

Sump 16 may be connected to valve 18 via a drain passage 38. Sump 16 may constitute a reservoir configured to hold the low-pressure supply of fluid. The fluid may include, for example, a dedicated hydraulic oil, an engine lubrication oil, a transmission lubrication oil, or any other fluid known in the art. One or more hydraulic circuits may draw fluid from and return fluid to sump 16. It is contemplated that hydraulic circuit 10 could be connected to multiple separate sumps 16 or to a single sump 16, as desired. A relief valve (not shown) could be associated with drain passage 38, if desired, to help maintain a desired pressure within hydraulic circuit 10.

Valve 18 may fluidly communicate with tool actuators 12 via head- and rod-end passages 40, 42, and selective pressurization of passages 40, 42 may cause desired actuator movements. For example, to retract tool actuators 12, rod-end passage 42 may be filled with fluid pressurized by pump 14 (i.e., passage 42 may be connected with passage 34), while head-end passage 40 may be drained of fluid (i.e., passage 40 may be connected with passage 38). In contrast, to extend tool actuators 12, head-end passage 40 may be filed with fluid pressurized by pump 14, while rod-end passage 42 may be drained of fluid. Valve 18 may facilitate these connections.

In the disclosed example, valve 18 is electro-hydraulically operated. Specifically, valve 18 may be selectively energized to cause associated elements to move between different positions that generate corresponding pilot signals (i.e., flows of pilot fluid). The pilot fluid may flow from a pilot pump 44 through a pilot passage 46 to valve 18, and cause the connections described above to be made. In other embodiments, however, valve 18 could be a purely hydraulically-operated valve or a purely electrically operated valve, if desired. In these latter embodiments, pilot pump 44 and pilot passage 46 would be omitted.

Figure 2A:
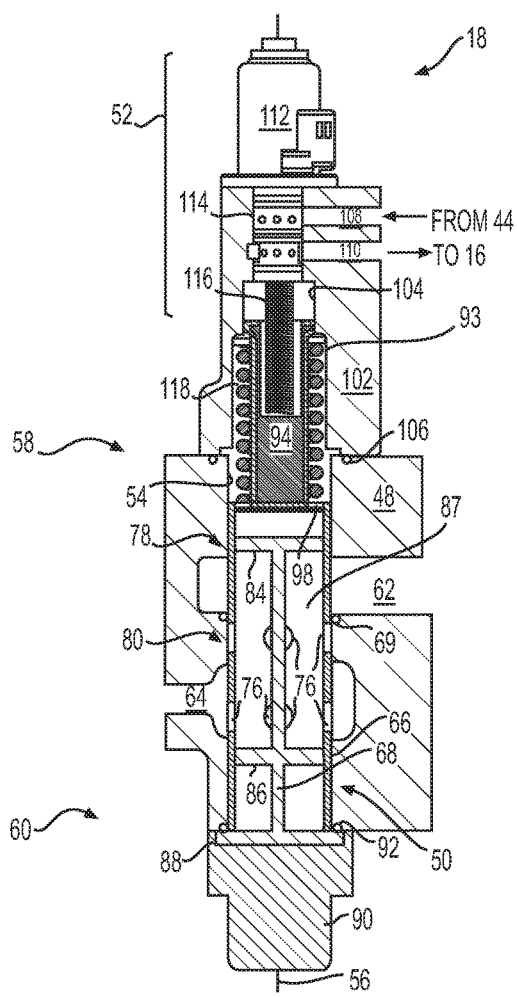
FIGS. 2A and 2B are cross-sectional illustration of an exemplary disclosed valve that may be used in conjunction with the hydraulic circuit of FIG. 1.
Figure 2B:
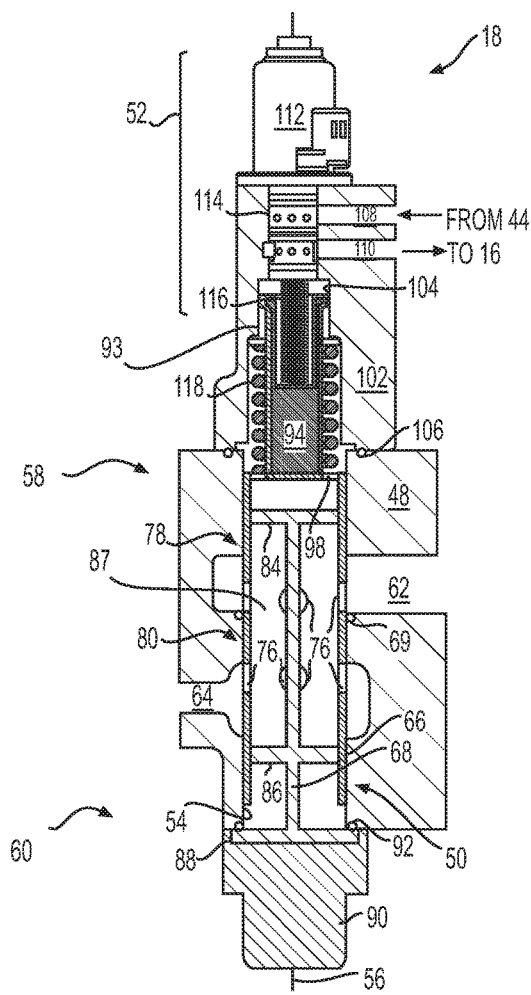

As shown in FIGS. 2A and 2B, valve 18 may consist of at least three primary components, including a valve block 48, a spool assembly 50 disposed in valve block 48, and a valve actuator 52 mounted to valve block 48 and configured to move portions of spool assembly 50. It should be noted that FIGS. 2A and 2B illustrate only one exemplary embodiment of valve 18 that could be used to control fluid flow into either of head-end or rod-end passages 40, 42, or fluid flow out of either of head-end or rod-end passages 40, 42. In particular, the embodiment of valve 18 shown in FIGS. 2A and 2B could be associated with only the head-end of tool actuator 12 or only the rod-end, and could function to only supply fluid to tool actuator 12 or to only drain fluid away from tool actuator 12. Accordingly, hydraulic circuit 10 (referring to FIG. 1) could have four of the same valves 18 that are shown in FIGS. 2A and 2B to provide for the full functionality of tool actuators 12 or, alternatively, hydraulic circuit 10 could have the one valve 18 shown in FIGS. 2A and 2B and up to three other valves that are not shown. In the disclosed embodiment, valve 18 includes a single common valve block 48 (see FIG. 1), as well as four separate spool assemblies 50 and four separate valve actuators 52 that are connected to the same valve block 48. In other embodiments, however, each spool assembly 50 and valve actuator 52 could be associated with a separate valve block 48. If multiple valve blocks 48 are included, they may be bolted together or connected to each other via conduits.

Valve block 48 may have a bore 54 formed therein for each spool assembly 50 that is housed in valve block 48. Bore 54 may have a central axis 56, and extend from a first end 58 to a second end 60 along axis 56. A first passage 62 may be formed adjacent first end 58 that intersects with (i.e., is in fluid communication with) bore 54, and a second passage 64 may be formed adjacent second end 60 that also intersects with bore 54. In general, first and second passages 62, 64 may be oriented within valve block 48 generally orthogonal to central axis 56, and spaced apart from each other in an axial direction of bore 54. In the disclosed embodiment, bore 54 may be enlarged at first and second passages 62, 64 such that, when spool assembly 50 is disposed inside of bore 54, each of passage 62, 64 may communicate with an entire periphery of spool assembly 50 at the enlarged locations.

A portion of spool assembly 50 may be movable inside bore 54 along axis 56 to selectively connect or block fluid flow between first and second passages 62, 64. As shown in FIGS. 2 and 3, spool assembly 50 may include, among other things, an elongated cylindrical body ("body") 66 that is hollow, and an insert 68 that is disposed inside body 66. Insert 68 may be fixedly connected to block 48, while body 66 may be configured to slide in an axial direction relative to block 48 and insert 68. As will be explained in more detail below, as body 66 slides relative to block 48, first passage 62 may either be blocked from or connected to second passage 64. In one embodiment, a radial clearance between an outer surface of body 66 and an inner surface of bore 54 may be small enough to inhibit fluid leakage. In other embodiments, however, body 66 may include an annular seal (e.g., an o-ring 69) to inhibit the leakage.

Body 66 may include a first open end 70, a second open end 72, and an internal bore 74 that passes from first open end 70 to second open end 72. Internal bore 74, in the disclosed embodiment, has a substantially consistent internal diameter along its length (i.e., no intentional restrictions are located inside bore 74). A plurality of radial orifices 76 may be formed in body 66 that extend completely through an annular wall 77. Orifices 76 may be arranged into multiple different groupings, and each grouping may be spaced axially-apart from an adjacent grouping and associated with a different passage in block 48. For example, two groupings 78, 80 are shown in FIGS. 2 and 3 that correspond to the number of passages (i.e., first and second passages 62, 64) that need to be interconnected by spool assembly 50. The orifices 76 within each separate grouping 78, 80 may be located at a common axial position, and have the same diameter and shape or different diameters and shapes, as desired. In the disclosed embodiment, orifices 76 may be circular drillings or milled slots, and a combined flow area of all orifices 76 within any one of groupings 78 or 80 may be about the same or greater than a flow area of the corresponding passage 62 or 64. Any number of orifices 76 may be included within each grouping and spaced around a circumference of body 66 in any manner (e.g., equally or unequally).

Insert 68 may include a stem 82, and a plurality of lands that are axially spaced apart along stem 82. In the disclosed embodiment, insert 68 includes two dividing lands 84, 86 and one mounting land 88, all of which are connected to each other (e.g., via welding, threaded fastening, casting, forging, machining, etc.). It is contemplated that insert 68 may have any number of dividing and mounting lands connected to stem 82. Each of dividing lands 84, 86 and mounting land 88 may be generally disk-shaped, while stem 82 may be generally rod-like. It is contemplated that stem 82 may be one continuous rod that passes completely through dividing land 86, that stem 82 may comprise multiple rod segments joined to each other via dividing land 86, or that stem and one or more of the lands are integrally formed as a single component. Stem 82 may have a generally consistent cross-sectional shape (e.g., circular) and outer diameter, and the outer diameter may be much smaller than (e.g., $\frac{1}{3}^{rd}$ to $\frac{1}{10}^{th}$ of) a diameter of dividing lands 84, 86. It is contemplated, however, that stem 82 could flare radially outward at any one or more of the lands, if desired. In an embodiment, the mounting land 88 can comprise or be replaced by a pin, a spherical joint, a snap ring, or any combination thereof.

Dividing lands 84, 86 may each be configured to divide and/or isolate axial spaces inside bore 74 of body 66. For example, dividing land 84 may be located adjacent orifice grouping 78, while dividing land 84 may be located adjacent orifice grouping 80 to thereby define an isolated cylindrical space inside bore 74. In this example, all orifices 76 are located between dividing lands 84, 86 (i.e., in communication with the cylindrical space), and dividing lands 84, 86 are configured to contain the fluid being communicated between passages 62, 64 inside bore 74. Lands 84, 86 may inhibit fluid leakage in an axial direction out through first and second open ends 70, 72 of body 66. In one embodiment, a radial clearance between an outer edge of lands 84, 86 and an inner surface of wall 77 may be small enough to inhibit fluid leakage. In other embodiments, however, one or both of lands 84, 86 may include an annular seal (e.g., an o-ring 89 is shown in FIG. 3 at only dividing land 84) to inhibit the leakage.

Mounting land 88 may be larger than (e.g., have a larger diameter and/or thickness than) dividing lands 84, 86, and be used to connect insert 68 to block 48. In particular, mounting land 88 may remain outside of body 66 at the second end, and be sandwiched between block 48 and an end cap 90 (shown in FIG. 2). In some embodiments, a seal (e.g., an o-ring 92) may be located between an inner surface of mounting land 88 and an outer surface of block 48. It should be noted that insert 68 may be axially aligned inside body 66 by way of lands 84 and 86, and only loosely fitted to cap 90. This alignment feature may reduce the tolerances normally required for a spool-type valve.

A feedback element 94 may be used to connect body 66 to actuator 52 (referring to FIGS. 2A and 2B). In the disclosed embodiment, feedback element 94 is a generally solid cylinder connected to first open end 70 in such a way that first open end 70 remains substantially open. For example, feedback element 94 may have a smaller outer diameter than body 66, be axially aligned with body 66, and connect to body 66 by way of a plurality of spokes 96 (see FIG. 4) that extend radially between body 66 and the proximal end of feedback element 94. In this configuration an annular spacing 98 between spokes 96 may be still be open.

As discussed above, valve actuator 52, in the disclosed example, is an electro-hydraulic type of actuator. In particular, valve actuator 52 may be selectively energized to communicate pilot signals with the end of spool assembly 50 (e.g., with the distal end 93 of feedback element 94) that cause spool assembly 50 to move between open (i.e., flow passing) and closed (i.e., flow-blocking) positions. When spool assembly 50 is in the open position (shown in FIG. 2B), grouping 78 of orifices 76 may be in communication with first passage 62 and grouping 80 of orifices 76 may be in communication with second passage 64, such that fluid may flow between passages 62, 64 via orifices 76 and bore 74. In contrast, when spool assembly 50 is in the closed-position (shown in FIG. 2A), orifices 76 may be blocked from communication with passages 62, 64 by block 48. It should be noted that, although a specific embodiment of valve actuator 52 is shown in FIGS. 2A and 2B, other types of valve actuators could alternatively be included in valve 18.

In the exemplary embodiment of FIGS. 2A and 2B, valve actuator 52 includes an actuator housing 102 having a bore 104 formed therein that is in general alignment with bore 54 of valve block 48. Actuator housing 102 may be connected to an end of valve block 48, and a seal (e.g., an o-ring 106) may be located therebetween and around bores 54 and 104. Feedback element 94 may be reciprocatingly disposed within bore 104 and extend into bore 54 to connect with body 66. A first pilot supply passage 108 and a pilot drain passage 110 may be located in housing 102, and configured to communicate pilot pump 44 (e.g., via passage 46—referring to FIG. 1) and sump 16, respectively, with the distal end 93 of feedback element 94. A solenoid 112 may be connected to housing 102 at the outer end, and include a plunger (not shown) that is electromagnetically movable within an orifice cage 114 to selectively connect one of first pilot supply and pilot drain passages 108, 110 with bore 104. A first spring 116 may extend between the plunger and the distal end 93 of feedback element 94, and function to provide force feedback when solenoid 112 is energized and valve 18 is open. A second spring 118 may be located between the first end 58 of body 66 and a shoulder of bore 104, and function to close valve 18 when solenoid 112 is de-energized.

Controller 20 (referring to FIG. 1) may embody a single microprocessor or multiple microprocessors that include a means for monitoring operator input and responsively adjusting flow directions and/or pressures within hydraulic circuit 10. For example, controller 20 may include a memory, a secondary storage device, a clock, and a processor, such as a central processing unit or any other means for accomplishing a task consistent with the present disclosure. Numerous commercially available microprocessors can be configured to perform the functions of controller 20. It should be appreciated that controller 20 could readily embody a general machine controller capable of controlling numerous other machine functions. Various other known circuits may be associated with controller 20, including signal-conditioning circuitry, communication circuitry, and other appropriate circuitry. Controller 20 may be further communicatively coupled with an external computer system, instead of or in addition to including a computer system, as desired.

In some embodiments, controller 20 may rely on sensory information when regulating the flow directions and/or pressures within hydraulic circuit 10. For example, instead of or in addition to the signals generated by interface device 22, controller 20 may communicate with one or more sensors (not shown) to detect actual pressures inside hydraulic circuit 10. These sensors could be mounted in valve block 48 and/or housing 102, if desired. Controller 20 may then automatically adjust flow directions and/or pressures based on the signals generated by the sensors.

Interface device 22 may embody, for example, a single or multi-axis joystick located proximal an operator seat (not shown). Interface device 22 may be a proportional device configured to position and/or orient a work tool (not shown) by producing signals that are indicative of a desired work tool speed and/or force in a particular direction. The position signals may be used by controller 20 to cause corresponding movements of tool actuator 12 (e.g., by selectively energizing actuator 52). It is contemplated that different interface devices 22 may additionally or alternatively be included in hydraulic circuit 10 such as, for example, wheels, knobs, push-pull devices, switches, pedals, and other operator input devices known in the art.

INDUSTRIAL APPLICABILITY

The disclosed valve and spool assembly may be applicable to any hydraulic circuit. The disclosed valve and spool assembly may provide high-performance control of a tool actuator in a low-cost and low-weight configuration. Control over movement of tool actuator 12 will now be described in detail with reference to FIGS. 1 and 2.

During operation of hydraulic circuit 10 (referring to FIG. 1), pump 14 may be driven to pressurize fluid. The pressurized fluid may be directed past check valve 36 to valve 18 via pressure passage 34. At this same time, pilot fluid may be pressurized by pilot pump 44 and directed to valve 18 via pilot supply passage 46. An operator of hydraulic circuit 10 may request movement of tool actuator 12 (e.g., extension or retraction) by manipulating (e.g., tilting) interface device 22 in a corresponding direction by a corresponding amount. Electronic signals generated by interface device 22 may be directed to controller 20, which may responsively energize or de-energize particular valve actuator(s) 52 to achieve the desired tool motion.

During the normal or default state of valve 18, valve actuator 52 may be de-energized. As shown in FIG. 2A, when valve actuator 52 is de-energized, feedback element 94 may be connected to sump 16 via pilot drain passage 110. At this time, the biasing force of springs 118 may function to urge body 66 of spool assembly 50 downward (relative to the perspective of FIG. 2A), such that all orifices 76 are blocked by the inner block wall of bore 54. In this state, first and second passages 62, 64 may be inhibited from communicating with each other via bore 74 of body 66.

When valve actuator 52 is energized, the plunger inside of orifice cage 114 may be moved upward to communicate pilot supply passage 108 with the distal end 93 of feedback element 94. This communication may result in a pressure imbalance across body 66 of spool assembly 50 that causes body 66 to be pushed upward (shown in FIG. 2B). As body 66 moves upward, orifices 76 of grouping 78 may be aligned with first passage 62 at the same time that orifices 76 of grouping 80 are aligned with second passage 64, thereby initiating communication between first and second passages 62, 64 via bore 74. In one example, this could result in pressurized fluid flowing into one of head- and rod-end chambers 28 or 30 of tool actuator 12 from pump 14. In another example, this could result in the draining of one of head- and rod-end chambers 28 or 30 of tool actuator 12 into sump 16. As body 66 moves further upward, a greater flow area of orifices 76 may be uncovered, allowing for a greater flow rate of fluid being communicated between first and second passages 62, 64 and a corresponding greater velocity of tool actuator 12.

Several benefits may be associated with the disclosed valve and spool assembly. In particular, because body 66 of spool assembly 50 may be hollow and without any restrictions or blockages to axial flow, body 66 may be lightweight and displace little fluid during its axial movement. This may reduce a force required to move body 66, which may result in increased responsiveness of valve 18.

It will be apparent to those skilled in the art that various modifications and variations can be made to the disclosed spool assembly and valve. Other embodiments will be apparent to those skilled in the art from consideration of the specification and practice of the disclosed spool assembly and valve. It is intended that the specification and examples be considered as exemplary only, with a true scope being indicated by the following claims and their equivalents.

What is claimed is:

1. A valve, comprising:
   a block having:
      a bore;
      a first passage extending to the bore at a first axial location; and
      a second passage extending to the bore at a second axial location;
   a spool assembly disposed within the bore of the block and having:
      a cylindrical body that is hollow and has a least a first radially oriented orifice that passes through a wall of the cylindrical body to communicate with the first passage, and at least a second radially oriented orifice that passes through the wall of the cylindrical body to communicate with the second passage; and
      an insert slidably disposed inside the cylindrical body, fixedly connected to the block, and having a first land located at a first end adjacent the at least a first radially oriented orifice and a second land located at a second end adjacent the at least a second radially oriented orifice; and
   an actuator configured to move the cylindrical body of the spool assembly relative to the block and the insert.

2. The valve of claim 1, wherein
   the insert has a mounting land formed at one end; and
   the valve further includes an end cap configured to close off an end of the bore and to clamp the mounting land to the block.

3. The valve of claim 1, further including a feedback element connected to an open axial end of the cylindrical body by way of a plurality of spokes, wherein the actuator is an electro-hydraulic actuator configured to selectively communicate a control pressure with a distal end of the feedback element.

4. The valve of claim 3, further including:
   a first spring configured to bias the cylindrical body toward a flow-blocking position; and
   a second spring configured to bias the feedback element away from the actuator.

5. The valve of claim 1, wherein:
   the at least a first orifice includes a plurality of first orifices all located at a common first axial position;
   the at least a second orifice includes a plurality of second orifices all located at a common second axial position;
   the plurality of first orifices and the plurality of second orifices are located axially between the first and second lands; and
   the cylindrical body is open between the first and second lands.

6. A hydraulic circuit, comprising:
   an actuator;
   a pump;
   a sump; and
   a valve disposed between the actuator, the pump, and the sump, the valve including:
      a block having:
         a bore with a first end and a second end;
         a first passage formed adjacent the first end in communication with the bore and in communication with the actuator;
         a second passage formed adjacent the second end in communication with the bore and in communication with one of the pump and the sump; and
      a spool assembly disposed within the bore of the block and having:
         a cylindrical body that is hollow and has a least a first radially oriented orifice that passes through a wall of the cylindrical body to communicate with the first passage and at least a second radially oriented orifice that passes through the wall of the cylindrical body to communicate with the second passage; and
         an insert slidably disposed inside the cylindrical body, fixedly connected to the block, and having a first land located at a first end adjacent the at least a first radially oriented orifice and a second land located at a second end adjacent the at least a second radially oriented orifice; and
      a valve actuator connected to the block and configured to move the cylindrical body of the spool assembly relative to the block and the insert.

* * * * *